March 27, 1962

J. A. BROWNING 3,027,446

ARC TORCH

Filed Sept. 15, 1960

Inventor
James R. Browning

Wm O Moeser
Atty.

United States Patent Office 3,027,446
Patented Mar. 27, 1962

3,027,446
ARC TORCH
James A. Browning, Hanover, N.H., assignor to
Thermal Dynamics Corporation
Filed Sept. 15, 1960, Ser. No. 56,221
8 Claims. (Cl. 219—75)

This invention relates to plasma-jet torches and relates more particularly to a novel method and means for introducing gases into such torches.

It has long been known that gases introduced in proximity to, or along a high pressure electric arc may be heated to extremely high temperatures. The dissociated and ionized gas streams resulting from such heating may be used in a wide variety of applications in high temperature technology.

In prior art devices the two electrodes are generally spaced to form a chamber. An electrc arc is established between the electrodes and gas is introduced into the chamber. In some cases the gas may be introduced tangentially to form a vortex around the arc stream. It has not heretofore been appreciated that gases may be directed in such manner as to substantially improve operating conditions right at the face, or surface of the electron emiting electrode. In accordance with this invention I prefer to establish a vortex at the surface of at least one electrode. This novel method of introducing the gaseous medium leads to many unanticipated advantages, in addition to the basic purpose of supplying gas to the torch.

It is accordingly a principal object of this invention to provide a novel method of supplying gaseous elements to high temperature arc torches and to provide means for carrying out said method.

It is a further object of this invention to provide new and improved torch elements to carry out the teachings herein in a practical and economical manner.

Further objects and advantages of this invention will become readily apparent from the following specification read together with the accompanying drawing, in which.

Figure 1:
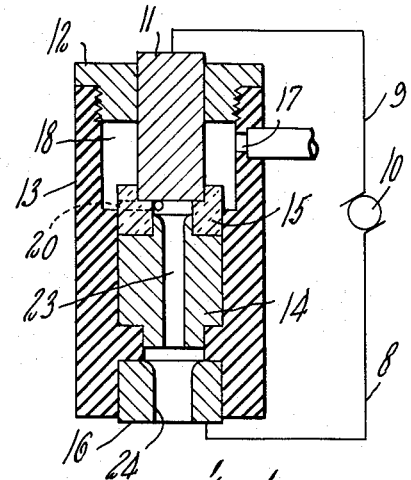
FIGURE 1 is an overall, largely cross-sectional view of a plasma torch embodying the principles of the invention.

Referring now more particularly to the drawing, in FIGURE 1 I show a torch having two electrodes, a cathode 11 and an anode 16 across which an arc is established during operation of the device. In this instance, I employ straight polarity; that is, a D.C. power supply 10 supplies current through lead 9. Electrons are emitted from the face of cathode 11, pass through passage 23 and strike the inner wall of passage 24 in anode 16. The electric circuit is completed by lead 8 running back to the power supply indicated at 10.

The cathode 11 is held in member 12 which is threaded to an electrically non-conducting body 13. A ceramic piece 15 separates the face of cathode 11 from an inner nozzle 14. This nozzle 14 is electrically "floating" during operation of the torch and defines an elongated passageway 23 through which the arc stream passes.

Gas to be heated by the arc is introduced into chamber 18 through an aperture 17. This gas, under suitable pressure, passes through tangentially disposed hole 20 and flows across the face of the cathode 11. This flow is preferably vortical in configuration, and I use pressures and orifice sizes to create gas velocities up to or even greater than sonic, to produce a strong vortex at the cathode surface.

Figure 3A:
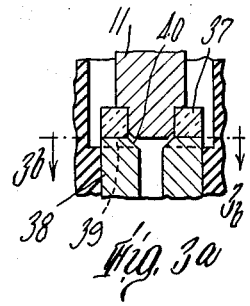
FIGURE 3a is a further detail of a portion of the torch structure of FIG. 1.
Figures 3B, 3C:
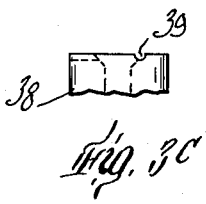
FIGURE 3b is a view on the section line 3b—3b of FIG. 3a, and 3c is a further detail of FIGURE 3b.
Figure 4:
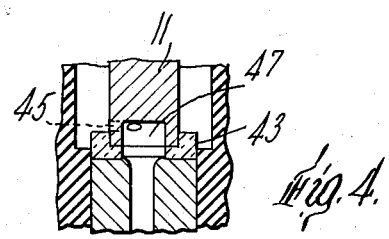
FIGURE 4 shows alternate geometrical arrangements of an electrode and gas passages for practicing the invention.

The piece 15 may take an alternate form shown best in FIGURES 3a and 3b. Here, four tangential cannelures 39 are provided to form a strong vortex of gas at the surface of cathode 11. Another arrangement for achieving this purpose is shown in FIGURE 4 where the tangential apertures may be formed in the cathode body itself, the cathode 11 then being nested in the retaining piece 43.

A great many advantages are derived from a torch constructed and operated as described above. I produce high strength vortexes right at the cathode surface. The arc, following the path of least resistance, flows through the low density vortex core. This core is at the center of the cathode surface. The emitting area is thus centrally positioned well away from the nearest metal sections which might otherwise offer an alternate path for current flow.

Another important consideration is that the low pressure core extends to the very surface of the cathode. This produces ideal conditions for the emission of electrons from said surface. Furthermore, the molten or near molten emission area is surrounded by relatively cool gas, thus providing an annular area to which heat from the center can flow across a high gradient. This makes for a longer cathode life than has heretofore been obtainable.

Still another advantage of a cathode vortex lies in the fact that maximum vortex strength can be utilized even in cases where other considerations dictate a close electrode spacing. No interelectrode space is wasted when a strong vortex is immediately established, with the central low pressure core running right from the cathode surface itself.

The principles of this invention are further ideally suited to cases where it is desirable to use two different types of gases. Often it has been desirable to use a gas which is highly suited to the heating purposes for which the torch is being used, and yet which has deleterious effects on the torch electrodes, particularly the emitting cathode. These effects may be chemical, in the case of reactive gases, or undesirable electrical characteristics may result. In addition, the gas which should be used may be relatively inexpensive but unusable for the reasons suggested.

In such cases, I provide a strong vortex of an inert gas right at the cathode surface as explained above. This gas may be used in relatively small amounts, but being so introduced, the cathode surface is effectively shielded from the main gas stream introduced at a point more remote from that surface.

Figure 2:
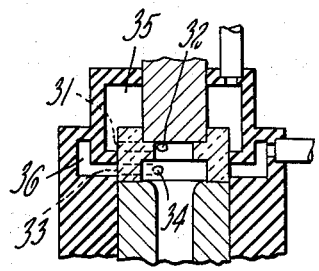
FIGURE 2 is a detail, in cross section of a portion of the torch of FIG. 1; with a variation explained below.

Referring to FIGURE 2, an arrangement is shown for accomplishing this result. The inert, protective gas, flows from chamber 35, through tangential passage 31 and orifice 32 to create a surface vortex. The more reactive gas, and usually in greater volume, flows from chamber 36 through tangential passageway 33 and orifice 34. It should be understood here that a plurality of tangential passageways may be employed to advantage, as in FIGURE 3b.

An important use of such a double-flow of gases is for the attainment of high power operation using a gas such as nitrogen. Nitrogen is relatively inert with respect to the cathode material. However, being diatomic, it leads to high heating levels of the cathode emitter. Argon provides much improved cathode action, allowing double the current flow. However, argon has a low arc voltage characteristic and requires high currents (when used alone) to gain high power. Nitrogen has higher arc voltage characteristics. Coupling the desirable characteristics of each gas in the method of this invention leads to greatly increased power levels of operation and higher gas pressure levels. Also, only small quantities of the more expensive argon are required to get desirable cathode operating conditions.

A second use of the geometry of FIGURE 2 concerns the use of chemically reactive gases. For example, oxygen and air lead to rapid erosion of the molten cathode surface. Shielding this surface using a small flow of inert gas ($N_2$, A, He, etc.) provides for reliable torch operation using reactive gases.

The remaining figures illustrate electrode-ceramic-nozzle geometries which have been found to be suitable. In FIGURE 3a the electrode 11 is contained in a plane with the top of the nozzle 38. The bevel 40 provides the close spacing required to sustain the high-frequency discharge. During ignition of the arct the high-frequency starting discharge is positioned across the shortest distance between the cathode 11 and the nozzle 38. When the main D.C. power is activated, the initial D.C. flow follows the path described by the high-frequency discharge. The high velocity vortex sweeps the main arc into the center of the electrode 11 and the nozzle 38. In this case the gas flows through tangentially disposed slots 39 cut in the nozzle 38. Different nozzle sizes may require different gas flow rates. As critical pressure drops are desired, each nozzle can have the optimum gas flow merely by machining in the correct total slot cross-sectional area. The operator only has to adjust the inlet gas pressure to achieve optimum gas flow conditions.

In FIGURE 4 the swirl holes 45 are contained within the cathode piece 11 to discharge into the cavity 47. In all cases it is important that the initial flow establishing the vortex be directed across the face of the electrode. It is this face which contains the cathode spot as heretofore explained.

Figure 5:
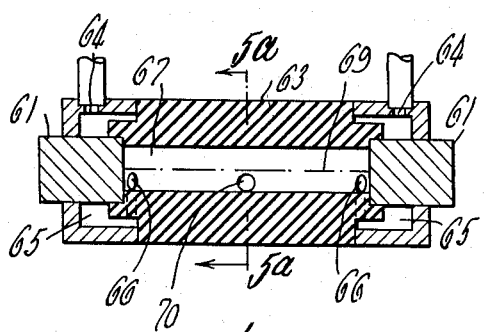
FIGURE 5 illustrates a double-ended torch adapted for A.C. operation and employing the principles of the invention.
Figure 5A:
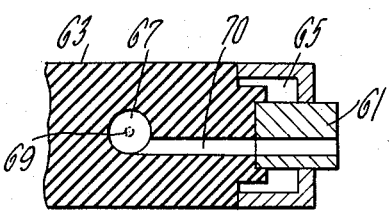
FIGURE 5a is a view to clarify the description of the torch shown in FIGURE 5.

Although the description of this invention has referred to straight-polarity arrangements, it is also applicable to the case of reversed-polarity and to the use of alternating current. FIGURE 5 shows one possible arrangement of an arc torch utilizing A.C. current and using the principles of the invention. In this case each electrode is of the same geometry and function as heretofore described, and acts, alternately, as both cathode and anode. The A.C. arc 69 passes between the electrodes 61 through the passage 67 contained in electrically non-conducting piece 63. The gas is introduced at each end of the torch through holes 64, chambers 65, and holes 66 tangentially arranged to form two vortices (rotating in the same sense) and which flow inwardly towards the center of the passage 67 where they meet and exit through the tangentially disposed exit passage 70.

Although the discussion so far has related to arc torches in which the arc is contained by the torch, the principles are equally applicable to "transferred-arc" torches where the second electrode lies exterior to the torch. In this case the geometries establishing the desired flow parameters at the first electrode are the same as for the cases discussed. The arc column, once formed, passes through a passage to discharge across to the exterior anode.

The important feature of this invention is the establishment of vortex flow across the surface, and around the peripheral area of an emitting electrode. While variations of my invention concept may occur to persons skilled in this art, I intend to comprehend all such variations within the spirit and scope of the following claims.

I claim:

1. In an arc torch, at least one electrode having an electron emitting surface, and a tangential gas passage opening at and in the plane of said surface.

2. In an arc torch, at least one electrode having an electron emitting surface, and a plurality of tangentially disposed gas passages opening at and in the plane of said surface.

3. In an arc torch, a first electrode having an electron emitting surface, an anode spaced from said electrode, an external circuit connecting said electrode and said anode including a source of electrical energy for establishing an arc therebetween, a member between said electrode and said anode defining an arc passageway, and means for introducing a gas tangentially into said passageway at and in the plane of said surface.

4. In an arc torch, a first electrode having an electron emitting surface, an anode spaced from said electrode, an external circuit connecting said electrode and said anode including a source of electrical energy for establishing an arc therebetween, a member between said electrode and said anode defining an arc passageway, and means for introducing a first gas in a vortex at said surface, and means for introducing a second gas in said passageway at a point more remote from said surface.

5. In an arc torch with at least one electrode having an electron emitting surface, a nozzle element defining an arc passage extending from said surface, a tangentially disposed gas passage at and substantially in the plane of said surface, and a second gas passage opening into said arc passage more remote from said surface.

6. An arc torch according to claim 5 in which a plurality of gas passages are provided, all opening tangentially into and normal to the axis of said arc passage.

7. In an arc torch, an electron emitting electrode, a recess in the end of said electrode, means for establishing an arc stream emanating from said recess, at least one gas passage through the wall of said recess and opening tangentially at the bottom of said recess, and means for introducing gas into said passage, whereby said arc stream is substantially centered in said recess by the resulting vortex.

8. An arc torch comprising a pair of electrodes, an electrically non-conducting element separating said electrodes and defining an arc passage therebetween, electrical means for establishing an arc stream between the opposing faces of said electrodes, at least one gas passage at each electrode having an orifice opening tangentially into said arc passage; said openings being at the faces of said electrodes, and a discharge orifice in said arc passage between said electrodes.

References Cited in the file of this patent

UNITED STATES PATENTS

| 2,819,423 | Clark | Jan. 7, 1958 |
| 2,900,485 | Clark | Aug. 18, 1959 |